United States Patent Office 3,344,106
Patented Sept. 26, 1967

3,344,106
FILLED ORGANOPOLYSILOXANE COMPOSITIONS OF REDUCED STRUCTURE
Tse C. Wu, Waterford, N.Y., assignor to General Electric Company, a corporation of New York
No Drawing. Filed Aug. 1, 1963, Ser. No. 299,172
3 Claims. (Cl. 260—37)

This invention relates to improved organopolysiloxanes which are convertible to the cured, solid, elastic state. More particularly, the invention relates to organopolysiloxane compositions which are characterized by reduced structure and lowered knit time, such compositions comprising (1) organopolysiloxanes convertible to the cured, solid, elastic state, (2) a reinforcing structure-forming filler and (3) an additive for reducing the structure and knit time comprising tetraphenyldisilanediol.

When organopolysiloxanes which are convertible as by radiation, curing agents and the like to the cured, solid, elastic state are mixed with certain fillers which are typified by finely divided silicas, such as silica aerogel, fumed silicas, precipitated silicas and other similar materials which are described in Warrick Patent 2,541,137 and elsewhere, it is found that the compounded material becomes tough and nervy upon standing even for very short periods of time, sometimes as little as one day. This toughness and nerve of the filled, curable organopolysiloxane, which is also known as structure, are recognized by the presence of an undesirable snap and difficulty in rendering plastic the rubber compound by usual mechanical working as on a differential mill. These characteristics may appear even while the filler is being added to the organopolysiloxane. Upon storage for any appreciable length of time, even as little as several days, the structure increases to the point where excessive milling times are required to plasticize the material, thus making further working and treatment of the organopolysiloxane very difficult. This inability to obtain a plastic film from the organopolysiloxane after a reasonable period of working as on a differential mill is due to the fact that the compound will not knit readily with the result that the filled compounds must often be discarded. The term "knit time" as used herein is intended to mean the time required to produce a homogeneous, fused sheet on a differential mill from the vulcanizable organopolysiloxane rubber stock.

From the above it will be quite apparent that there is a definite need for convertible organopolysiloxanes containing structure producing fillers which can be readily milled in relatively short periods of time even after storage to produce a plastic, continuous sheet which is suitable for further processing and treatment. It is therefore a principal object of this invention to provide organopolysiloxanes which are so treated.

The hydroxy-containing additive employed in the practice of this invention is sym-tetraphenyldisilanediol, having the formula $(HO)(C_6H_5)_2SiSi(C_6H_5)_2(OH)$. This compound is well known in the art and described, for example, in the Journal of Organic Chemistry, 26, 1265 (1961). This compound will be referred to hereinafter, for brevity, as tetraphenyldisilanediol.

Those features of the invention which are believed to be novel are set forth with more particularity in the claims appended hereto. The invention will, however, be better understood from a consideration of the following description.

In the specification and in the claims, for brevity, the convertible organopolysiloxanes, which can be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although the convertible organopolysiloxanes with which the present invention is concerned are now well known in the art, for the purpose of showing the various convertible organopolysiloxanes which can be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950; all the foregoing patents being assigned to the same assignee as the present invention; Hyde Patent 2,490,357, issued December 5, 1949; and Warrick Patent 2,541,137, issued February 13, 1951.

It will, of course, be understood by those skilled in the art that other convertible organopolysiloxanes containing the same or different silicon-bonded organic substituents (e.g., methyl, ethyl, propyl, vinyl, allyl, phenyl, tolyl, xylyl, benzyl, phenylethyl, naphthyl, chlorophenyl, both methyl and phenyl, etc. radicals) connected to the silicon atoms by carbon-silicon linkages, can be employed in the present invention without departing from the scope of this invention. The particular convertible organopolysiloxane used is not critical and can be any one of those described in the foregoing patents generally obtained by condensation of a liquid organopolysiloxane containing an average of from about 1.95, preferably from about 1.98, to about 2.05 organic groups per silicon atom. The condensing agents which can be employed are well known in the art and can include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which can contain, if desired, for example, up to 2 mol percent copolymerized monoorganosiloxane, for example, copolymerized monomethylsiloxane. Generally, I prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$ where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mol percent) of any of the following units, alone or in combination therewith: $(C_6H_5)(CH_3)SiO$ and $(C_6H_5)_2SiO$. The presence of halogen, e.g., chlorine, atoms on the phenyl nucleus is not precluded.

The amount of additive employed for reducing structure and knit time of the filled convertible organopolysiloxane can be varied within wide limits. On a weight basis, amounts as low as 0.1% of the additive, based on the weight of the convertible organopolysiloxane, will be found to exert improvement in these properties. Generally, I prefer to employ the additives in amounts ranging from about 0.1 to 10%, by weight, and most preferably from about 4 to 10%, by weight, based on the weight of the convertible organopolysiloxane.

The finely divided fillers which have caused the above-described structure build-up and undesirable length of time for knitting of the convertible organopolysiloxane are usually finely divided silica fillers, many of which may contain hydroxyl groups either in the form of adsorbed moisture or as silicon-bonded hydroxyl groups, depending on the method by which they are prepared. Under some conditions of manufacture, these structure-inducing fillers can, however, contain hydroxyl groups bonded directly to silicon of the silica molecule, but due to modification of such silicas, for instance, by the introduction of silicon-bonded alkoxy groups in place of some of the silicon-bonded hydroxyl groups, increased structure and knit times result when these types of silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers are found described in U.S. Patents 2,541,137, 2,610,167 and 2,657,149. Such structure-causing fillers can be slightly acidic or alkaline (i.e., have pH's below or above 7) depending upon the method of manufacture, and can be obtained through an aerosol-aerogel process, by fuming processes such as by the vapor phase burning of silicon tetrachloride or ethyl silicate, etc.

Another finely divided reinforcing filler which has been employed with convertible organopolysiloxanes but which also imparts undesirable structure to the convertible organopolysiloxane is a finely divided gamma alumina of average particle size less than 100 millimicrons. Such a filler and its use in combination with convertible organopolysiloxanes are more particularly described and claimed in Patent 2,671,069, issued March 2, 1954, and assigned to the same assignee as the present invention. It has been found that the incorporation of small amounts of tetraphenyldisilanediol markedly reduces any structure in mixtures of the gamma alumina and the convertible organopolysiloxane while also greatly reducing the knit time. A still further advantage of using the tetraphenyldisilanediol additive in combination with a silicone rubber compound containing the gamma alumina as a filler resides in the reduction in the sticking of the latter filled materials when they are compression molded. Heretofore, the compression molding of convertible organopolysiloxanes containing the above-described gamma alumina as a filler has encountered a serious drawback due to the fact that difficulty has been encountered in removing molded articles from steel or aluminum mold cavities because of excessive sticking or adhesion of the molded product to the mold. The presence of small amounts of the organosilanol substantially eliminates this difficulty.

The amount of the structure-inducing filler used in combination with the convertible organopolysiloxane may obviously be varied within wide limits, for instance, from about 10 to 200 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, etc. The structure difficulty and excessive knit times are particularly troublesome when the above-described fillers comprise, by weight, from 0.2 to 0.6 part filler per part convertible organopolysiloxane. Obviously, mixtures of these reinforcing fillers, either alone or in combination with non-reinforcing fillers wherein the reinforcing filler comprises a sufficient amount, usually a majority of the weight of the fillers, to cause the undesirable structure build-up and increased knit time, may also be employed. Examples of other fillers which may be incorporated in combination with the structure inducing fillers may be, for instance, titanium dioxide, lithopone, zinc oxide, zirconium silicate, iron oxide, calcium carbonate, etc.

Various curing agents to effect more rapid conversion of the convertible organopolysiloxane to the cured, solid, elastic state can be incorporated. Among such curing agents may be mentioned, for instance, benzoyl peroxide, tertiary butyl perbenzoate, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradition without curing agents can also be employed for vulcanizing purposes.

The manner in which the present invention can be practiced may be varied widely. Ordinarily, the tetraphenyldisilanediol is incorporated in the convertible organopolysiloxane before any of the structure-inducing fillers are added in order to obviate the above difficulties of structure build-up and excessive knit times resulting from the subsequent presence of the above-described reinforcing, structure-inducing fillers. Of course, the additive can be incorporated after the filler has been added to the convertible organopolysiloxane, preferably at the same time or shortly thereafter before structure has had an opportunity to build up or the knit time has begun to increase. This incorporation of the additive can take place on usual rubber differential milling rolls. The presence of the additive will enable one to readily mill the filled silicone rubber compound, and in a relatively short period of time, much less than when the additive is absent, the rubber compound will begin to sheet and form a continuous (i.e., unbroken) film on the rolls, thereby permitting the incorporation of curing agents, dyes, pigments, compression set additives, etc. when desired for use with convertible organopolysiloxanes. In the absence of the additive, and after storage of the silicone rubber compound containing the structure-inducing filler, it will be found that long periods of time will be required before the silicone rubber compound will start to form a sheet, and longer times will expire before the compound will adhere to the rolls; usually a non-continuous, lace-like effect will be encountered for a long time before an unbroken, adhering sheet is attained. Alternatively, the tetraphenyldisilanediol can be added to the convertible organopolysiloxane which can then be blended with the structure-inducing filler at some future time. The presence of the additive will greatly reduce or eliminate the usual structure formation in the future and will also result in more reasonable knit times. When the silicone rubber compound is to be molded, the latter is heated in a mold at temperatures of the order of about 100° to 150° C. for varying lengths of time, for instance, from about 5 to 30 minutes or more. Molding pressures ranging from about 10 to 500 p.s.i. or more are advantageously used. The molded product is preferably given a further heat treatment at elevated temperatures, for example, for about 1 to 36 hours or more at 150° to 250° C. to bring out the optimum properties of the cured organopolysiloxane.

Where desired, solvent and dispersing media such as toluene, xylene, butanol, etc. can be employed to make solutions and dispersions for coating and impregnating purposes. These coating compositions can be used to treat (e.g., coat and impregnate) various sheet materials such as glass cloth, asbestos cloth, mica sheets, various fibers, and finely divided fillers, such as mica, glass fibers, asbestos floats, etc. Such treated products can be heated at the requisite temperature to remove solvent or dispersing media (if coating compositions are involved), and thereafter further heat-treated at the elevated temperatures recited previously to convert the organopolysiloxane to the cured, solid, elastic state.

The following examples will illustrate the practice of the present invention and are not to be taken as limiting in any way. The convertible methylvinylpolysiloxane gum employed in the examples had a viscosity of about three million centistokes and was a copolymer of dimethylsiloxane units and methylvinylsiloxane units with about 0.5 mol percent of the siloxane units being methylvinylsiloxane units.

*Example 1*

There were mixed together by weight 100 parts of the above convertible methylvinylpolysiloxane, 40 parts of a finely divided reinforcing fume silica known as Cab-O-Sil sold by Godfrey L. Cabot Company, Boston, Massachusetts, and 7.4 parts of tetraphenyldisilanediol along with 1.3 parts of a paste containing 50% of a curing agent, bis-2,4-dichlorobenzoyl peroxide, in a silicone fluid. The material was pressed in the form of a flat sheet at a temperature of about 120° C. for about 15 minutes and thereafter heat treated for 24 hours at 250° C. The knit time of this material after 14 days of storage was 95 seconds, the knit time being determined using a two-roll differential laboratory mill 3" x 8" at which the speed ratio was 1.4:1 with the faster roll revolving at a speed of about 60 r.p.m. The mill roll clearance was adjusted to pass a 12 mil thick soft solder slug at a temperature of around 70° to 90° F. In testing the material for knit time, 30 grams of the compound being tested are added to the nip of the roll in small pieces to permit passage therethrough. When all of the compound had passed through the nip once, the compound was then added to the nip again and a stop watch was triggered and timing begun until the compound became plastic and completely covered the width of the faster roll in a continuous solid film, the time to do this eventually being recorded as the "knit time."

*Example 2*

Example 1 was repeated except that 100 parts by weight of the methylvinylpolysiloxane gum was used along with 40 parts of the above finely divided silica filler and 1.3 parts of the same curing agent as in Example 1. The knit time of this material after 14 days storage without the addition of any knit time reducing material was 209 seconds.

*Example 3*

Example 1 was repeated using 100 parts of the methylvinylpolysiloxane gum, 40 parts of the above silica filler, 1.3 parts of the same curing agent as in Example 1 and 4.0 parts of diphenylsilanediol. The amount of diphenylsilanediol used was equivalent to that of the tetraphenyldisilanediol used in Example 1 on a molal basis. After treatment as in Example 1 above and storage for 14 days, the knit time of the material was found to be 151 seconds.

It will be seen that by the present invention there are provided organopolysiloxane materials containing structure-inducing fillers which can be readily plasticized after storage for long periods of time by usual mechanical working equipment. The materials provided herein can be utilized in many applications including those requiring extension molding, calendering and solvent disposal. They can be used for coating and impregnating purposes and are particularly useful for electrical insulating purposes particularly at elevated temperatures.

What I claim as new and desire to secure by Letters Patent of the United States is:

1. A composition of matter characterized by reduced structure and low knit time which comprises (1) an organopolysiloxane convertible to the cured, solid, elastic state and containing an average of from 1.95 to 2.05 organic groups per silicon atom, (1) from about 10 to 200%, by weight, based on the weight of said organopolysiloxane, of a structure inducing reinforcing silica filler, and (3) from about 0.10 to 10%, by weight, based on the weight of said organopolysiloxane, of sym-tetraphenyldisilanediol.

2. A composition of matter characterized by reduced structure and low knit time which comprises (1) an organopolysiloxane convertible to the cured, solid, elastic state and containing an average of from 1.95 to 2.05 organic groups per silicon atom, (2) from about 10 to 200%, by weight, based on the weight of said organopolysiloxane, of a structure inducing reinforcing silica filler, and (3) from about 4 to 10%, by weight, based on the weight of said organopolysiloxane, of sym-tetraphenyldisilanediol.

3. A composition of matter characterized by reduced structure and low knit-time which comprises (1) a methylvinylpolysiloxane convertible to the cured, solid, elastic state and containing an average of from about 1.95 to 2.05 organic groups per silicon atom, (2) from about 10 to 200%, by weight, based on the weight of said methylvinylpolysiloxane, of a structure inducing reinforcing silica filler, and (3) from about 0.10 to 10 percent, by weight, based on the weight of said methylvinylpolysiloxane of sym-tetraphenyldisilanediol.

References Cited

FOREIGN PATENTS 779,788  7/1957  Great Britain.
781,488  8/1957  Great Britain.

MORRIS LIEBMAN, *Primary Examiner.*

ALLAN LIEBERMAN, *Examiner.*